(12) United States Patent
Kunugi et al.

(10) Patent No.: US 8,165,390 B2
(45) Date of Patent: Apr. 24, 2012

(54) IMAGE DATA PROCESSING DEVICE AND IMAGE DATA PROCESSING METHOD

(75) Inventors: Kazumasa Kunugi, Hachioji (JP); Akira Matsushita, Hachioji (JP); Hiroyuki Fukuda, Hachioji (JP)

(73) Assignee: Olympus Corporation, Tokyo (JP)

( * ) Notice: Subject to any disclaimer, the term of this patent is extended or adjusted under 35 U.S.C. 154(b) by 980 days.

(21) Appl. No.: 12/141,491

(22) Filed: Jun. 18, 2008

(65) Prior Publication Data

US 2009/0016601 A1 Jan. 15, 2009

(30) Foreign Application Priority Data

Jun. 20, 2007 (JP) ................ 2007-162851

(51) Int. Cl.
*G06K 9/00* (2006.01)

(52) U.S. Cl. ...................................... 382/162

(58) Field of Classification Search .......... 382/162–166, 382/232–251; 358/1.9, 504, 515, 538–539; 345/589–604, 98, 72, 83, 22, 30; 348/33, 348/234, 222.1, 223.1, 557–558, 560
See application file for complete search history.

(56) References Cited

U.S. PATENT DOCUMENTS

| | | | | |
|---|---|---|---|---|
| 6,831,624 B1 * | 12/2004 | Harrold | .......................... | 345/98 |
| 6,885,394 B1 * | 4/2005 | Noguchi | .................... | 348/223.1 |
| 7,035,472 B2 | 4/2006 | Nichogi et al. | | |
| 7,554,692 B2 * | 6/2009 | Ajito | .............................. | 358/1.9 |
| 7,755,676 B2 * | 7/2010 | Ishibashi | ...................... | 348/234 |
| 8,004,577 B2 * | 8/2011 | Ishibashi | .................... | 348/222.1 |
| 8,098,300 B2 * | 1/2012 | Ishibashi | ...................... | 348/234 |

FOREIGN PATENT DOCUMENTS

| | | |
|---|---|---|
| EP | 1 278 160 | 1/2003 |
| JP | 2003-023631 | 1/2003 |
| JP | 3736394 B2 | 1/2003 |
| JP | 2006-101512 | 4/2006 |

* cited by examiner

*Primary Examiner* — Ishrat I Sherali
(74) *Attorney, Agent, or Firm* — Volpe and Koenig, P.C.

(57) ABSTRACT

N-band image data are output from an N-band image capture device, being capable of N>4 multiband image capturing, to an image data processing device. An image data evaluation information provision unit provides a determination unit with evaluation information on the basis of the input N-band image data. On the basis of the evaluation information, the determination unit determines whether to set the N-band image data or M-band image data having a smaller band number than the N-band image data as image data to be output. On the basis of a determination result of the determination unit, an output image data selection unit selects either the N-band image data or the M-band image data as the image data to be output to an image data recording unit.

20 Claims, 10 Drawing Sheets

IMAGE DATA PROCESSING DEVICE AND IMAGE DATA PROCESSING METHOD

FIELD OF THE INVENTION

This invention relates to an image data processing device and an image processing method for inputting and processing image data that are generated by dividing obtained image into four or more spectral bands.

DESCRIPTION OF THE RELATED ART

Various attempts have been made to ensure that the colors of a printed color image or an image of an object displayed on a television, a monitor display device, and so on approach colors that are recognized when the object is viewed directly by a human eye, or in other words to ensure that color reproduction approaching the actual object is achieved. Conventionally, an image is reproduced using three primary colors, typically R (red), G (green) and B (blue) or Ye (yellow), Cy (cyan) and Mg (magenta) as a base, but in recent years, a technique of displaying image by inputting image signal of four or more primary colors, obtained through image capture using a multi-spectrum camera, into a display device being capable of inputting four or more primary color image signal has been developed as a method of reproducing an image exhibiting higher color fidelity.

In this technique, the multi-spectrum camera comprises six filters having different transmission wavelength bands, for example, and is capable of generating a multiband (in this example, a six-band) image signal of R (red), G (green), B (blue), Ye (yellow), Cy (cyan), and Mg (magenta). Hereafter in this specification, an image using three primary colors as a base will be referred to as a three-primary color image, and image data for generating a three-primary color image will be referred to as three-primary color image data. Further, an image using four or more bands of colors will be referred to as a multiband image, and the corresponding image data will be referred to as multiband image data, and so on. The image includes both a still image (a still picture) and a moving image (a motion picture).

An advantage of image display using multiband image data is that the gamut of the displayed image can be enlarged. More specifically, in a conventional three-band RGB display device, when three chromaticity points obtained by individually illuminating respective RGB illuminants of the display device are plotted on a chromaticity diagram, a triangular area surrounded by these three points forms the reproducible color range (gamut) of the display device. By performing multiband processing appropriately, the size of a polygonal area formed by linking the chromaticity points corresponding to the respective primary colors can be increased beyond that of the aforementioned triangle, and accordingly, the gamut can be enlarged. As a result, the color fidelity of the displayed image can be increased, making it possible to reproduce clearer images and reproduce images with finer gradation.

Further, a technique of recording spectrum information relating to light (an input illuminant) used to illuminate an object during image pickup at the same time as the spectral characteristic, gamma characteristic and so on of the multi-spectrum camera and determining a spectral reflectance estimation of the object in post-processing is known as a multi-band image display technique. A technique for reproducing the colors of a displayed image which employs a so-called rendering illumination technique is known as a technique of performing image display using this spectral reflectance estimation.

A technique of displaying an image not simply by displaying an image of an object illuminated by an input illuminant, as in the prior art, but by displaying the object after simulating the appearance of the object in the environment to be illuminated by an observation illuminant, i.e. the light that illuminates the display device and an observer observing the image displayed on the display device, exists as an example of a technique for reproducing the colors of a displayed image using rendering illumination. In this technique, the image is displayed after multiplying the spectrum of the observation illuminant, which is obtained through measurement, by the aforementioned spectral reflectance estimation of the object to simulate the spectral characteristic of light reflected on the surface of the object (to be referred to in this specification as the spectral reflectance). When the observer observes an image displayed in this manner, the image appears extremely realistic, as if the object actually existed in front of the observer under the observation illuminant.

SUMMARY OF THE INVENTION

When the multiband technique described above is used, the color fidelity of the image displayed in the manner described above can be increased, leading to a heightened sense of reality. However, increases in definition and the number of bands lead to an increase in data volume, and therefore an increased band width is required to transmit and receive the data. Furthermore, when the data are recorded on a medium such as an optical disk, it may be impossible to secure sufficient recording time due to the increase in data volume.

This invention has been designed in consideration of these problems, and it is an object thereof to provide an image data processing technique with which the volume of image data can be reduced effectively without greatly reducing the image quality of a multiband image.

A first aspect of this invention is applied to an image data processing device that processes multiband image data of four or more bands. The image data processing device solves the problems described above by comprising: an image data evaluation information provision unit that provides evaluation information on the basis of input multiband image data; a determination unit that determines, on the basis of the evaluation information, whether image data to be output are the multiband image data or reduced band number image data having a smaller band number than the multiband image data; and an image data selection unit that selects either the multiband image data or the reduced band number image data as the image data to be output on the basis of a determination result of the determination unit.

A second aspect of this invention is applied to an image data processing method for processing multiband image data of four or more bands. The image data processing method comprises: providing evaluation information on the basis of input multiband image data; determining, on the basis of the evaluation information, whether image data to be output are the multiband image data or reduced band number image data having a smaller band number than the multiband image data; and selecting either the multiband image data or the reduced band number image data as the image data to be output on the basis of a determination result of the determination.

BRIEF DESCRIPTION OF THE DRAWINGS

Detailed description of embodiments of the inventions will be made with reference to the accompanying drawings.

DETAILED DESCRIPTION OF THE EMBODIMENTS

Figure 1:
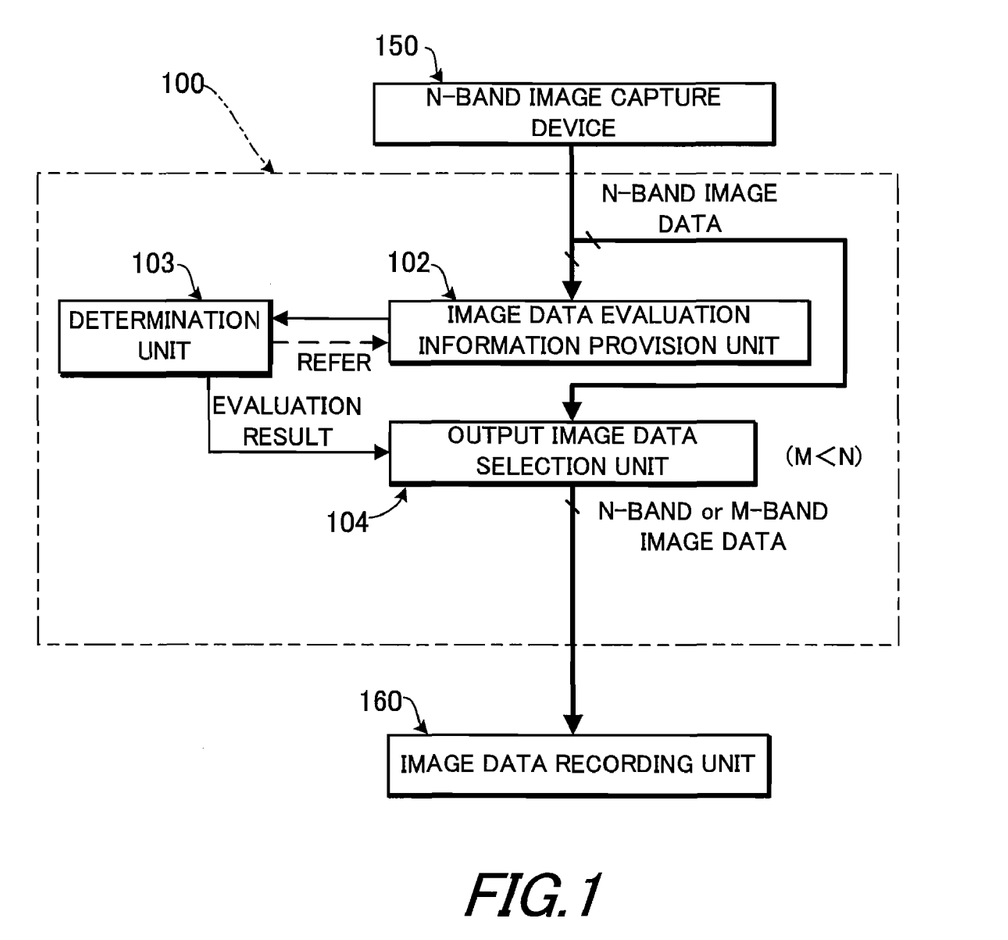
FIG. 1 is a block diagram illustrating the schematic constitution of an image data processing device according to an embodiment of this invention.

FIG. 1 is a block diagram illustrating the schematic constitution of an image data processing device 100 according to an embodiment of this invention. In this embodiment, an N-band image capture device 150 and an image data recording unit 160 are connected to the image data processing device 100. The N-band image capture device 150 may be a motion picture capture device or a still image capture device. In the following description, it is considered that the N-band image capture device 150 is a motion picture capture device. The N-band image capture device 150 may be a single plate type device. Alternatively, the N-band image capture device 150 may be a device in which N-color color filters are disposed in an appropriate arrangement pattern on a large number of light receiving portions arranged on a multi-plate type imaging device. The N-band image capture device 150 may also be a device in which N-color color filters having different transmission wavelength bands are disposed on a circumference or a straight line. In this case, image capture may be performed by a monochrome imaging device while switching the color filters sequentially, whereby N-band multiband image data are output. The N-band image capture device 150 may also be a device in which image capture can be performed by a monochrome imaging device while switching the characteristics of a liquid crystal filter configured to be capable of switching its transmission wavelength band electrically, instead of the N-color color filters described above, whereby N-band multiband image data are output. The image data recording unit 160 may employ a hard disk drive, semiconductor memory, magnetic tape, an optical disk, a magneto-optical disk, and so on as a recording medium.

The image data processing device 100 may be implemented as a device that is independent from other machines, such as a set top box or a computer, or may be built into the N-band image capture device 150 or the image data recording unit 160. The image data processing device 100 may also be built into a movie camera or a digital still camera in which an image capture device and a recording device are provided integrally. Further, the image data processing device 100 is not limited to a device that performs processing on image data output from the N-band image capture device 150. For example, the image data processing device 100 may be implemented as a device that performs processing on image data output from an image input machine such as a scanner or a machine that is capable of outputting N-band multiband image data, a CG image output by a computer, and image data obtained via a network such as a LAN or WAN, a television broadcast, a wireless broadcast, and so on, or as a device that processes and then records these data.

The image data processing device 100 comprises an image data evaluation information provision unit 102, a determination unit 103, and an output image data selection unit 104. The image data evaluation information provision unit 102 extracts M-band image data from input multiband image data. In this embodiment, an example in which the multiband image data are N-band multiband image data will be described, N being an arbitrary integer of four or more. Further, the band number M is smaller than N, i.e. an integer of three or more. Next, the image data evaluation information provision unit 102 performs an evaluation, to be described below, on at least one of an image generated by the M-band image data and an image generated by the N-band multiband image data, and outputs an evaluation result to the determination unit 103. On the basis of the evaluation result output by the image data evaluation information provision unit 102, the determination unit 103 determines whether to output the image data output from the image data processing device 100 as N-band multiband image data or as M-band image data having a reduced band number. The determination unit 103 then outputs a determination result to the output image data selection unit 104. On the basis of the determination result output by the determination unit 103, the output image data selection unit 104 selects either the N-band multiband image data or the M-band image data that can be input from the image data evaluation information provision unit 102, and outputs the selected data to the image data recording unit 160.

As will be described below, the image data evaluation information provision unit 102 has a function for evaluating the degree of apparent deterioration in the image quality when the band number of the image data is reduced. Several examples thereof will be described below with reference to the figures.

Figure 2:
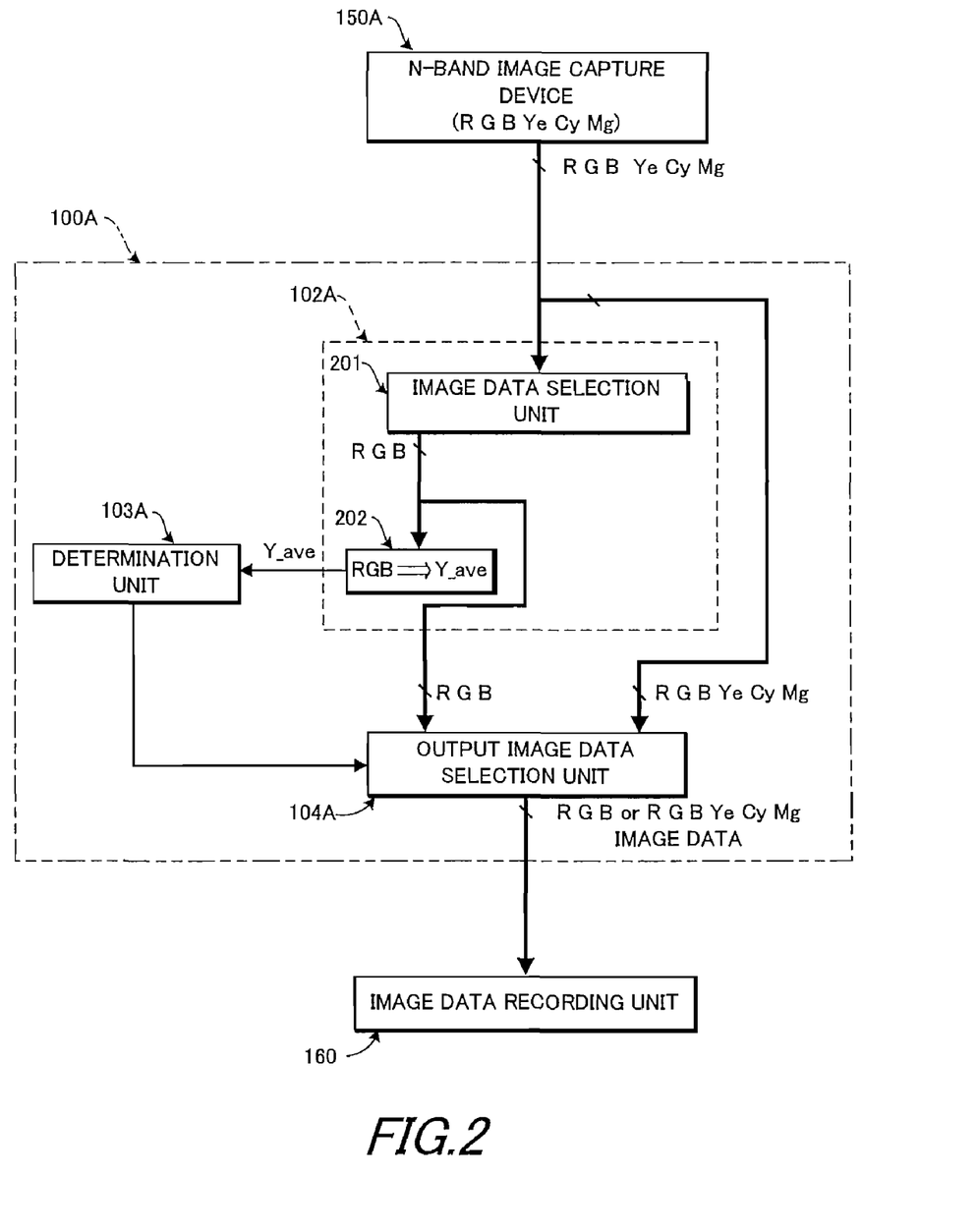
FIG. 2 is a block diagram illustrating an example in which the image data processing device according to an embodiment of this invention determines a luminance value on the basis of input image data.

FIG. 2 is a block diagram illustrating an embodiment in which an image data evaluation information provision unit 102A determines a luminance value Y from 3-band RGB image data. In FIG. 2, similar constitutional elements to those shown in FIG. 1 have been allocated identical reference symbols, and description thereof has been omitted. The following description centers on differences with FIG. 1. In the following description, an N-band image capture device 150A connected to an image data processing device 100A shown in FIG. 2 is capable of outputting six-band multiband image data in R (red), G (green), B (blue), Ye (yellow), Cy (cyan), and Mg (magenta). The image data evaluation information provision unit 102A comprises an image data selection unit 201 and an image evaluation unit 202. Of the six-band multiband image data input into the image data selection unit 201, RGB three-band image data are input into the image evaluation unit 202. On the basis of the input RGB three-band image data, the image evaluation unit 202 determines a luminance value Y (the Y value of a tristimulus value XYZ is suitable for this invention) for each pixel, and then determines an average value $Y_{\_ave}$ of the determined luminance values Y. When the image data corresponding to the respective colors R, G, B of each pixel are set respectively as R, G, and B, the luminance value Y may be calculated using the following equation, for example.

$$Y = 0.29891 \times R + 0.58661 \times G + 0.11448 \times B$$

The coefficients multiplied by the respective R, G, and B values in the above equation may be modified appropriately in accordance with differences in the spectral characteristics of the imaging device and filters and so on. Further, when calculating the average value $Y_{\_ave}$ of the luminance values Y, the luminance value Y may be determined for all of the pixels in the three-band RGB image data, whereupon the average value thereof is determined, or luminance values Y may be determined for each of a partial plurality of pixels, whereupon the average value thereof is determined.

Figure 5:
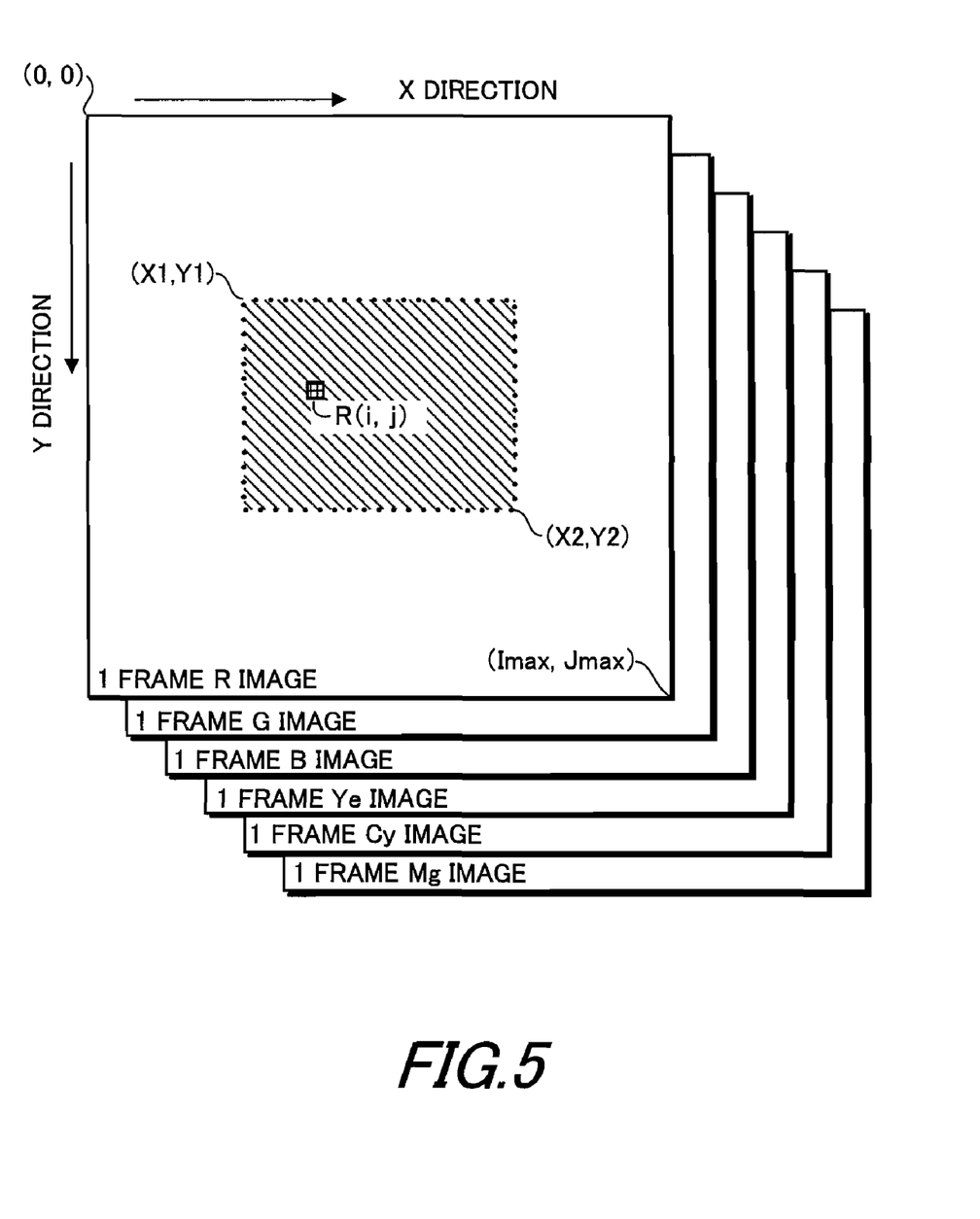
FIG. 5 is a schematic view showing an example of an evaluation subject area used when evaluating the image data in the image data processing device according to an embodiment of this invention.

When the average value $Y_{\_ave}$ of the luminance values Y is determined from image data corresponding to a part of the pixels, the image data for a plurality of pixels located in a predetermined area in the central part of the image may be used. This will now be described with reference to FIG. 5. FIG. 5 shows an outline of a state in which a single frame of six-band multiband image data is constituted by image data corresponding respectively to an R image, a G image, a B image, a Ye image, a Cy image, and a Mg image, each having a horizontal direction pixel count of $I_{max+1}$ and a vertical direction pixel count of $J_{max+1}$. In FIG. 5, a rectangular shaded region extending from a pixel position (X1, Y1) to a pixel position (X2, Y2) corresponds to the aforementioned predetermined area. It should be noted that in FIG. 5, the pixel position in the upper left corner is set as (0, 0). Further, only the predetermined area of the R image is shown in FIG. 5. The position and size of the predetermined area may be determined arbitrarily. In FIG. 5, the range of the predetermined area extends from a row X1 to a row X2, and from a column Y1 to a column Y2. In this example, R component pixel data, G component pixel data, B component pixel data, Ye component pixel data, Cy component pixel data, and Mg component pixel data exist in amounts corresponding respectively to the pixel count $\{(X2-X1+1) \times (Y2-Y1+1)\}$ in the predetermined area. R (i, j) shown in FIG. 5 denotes the R component pixel data of a pixel positioned $i+1^{th}$ in the row direction (X direction) and $j+1^{th}$ in the column direction (Y direction), using the upper left origin (0, 0) as a reference. In the following description, a similar method of expression to that of the R component pixel data will be used for the pixel data of the other color components, i.e. G (i, j), B (i, j), Ye (i, j), Cy (i, j), and Mg (i, j). Using these expressions, the luminance value Y (i, j) in the pixel position (i, j) can be calculated from the following equation.

$$Y(i,j) = 0.29891 \times R(i,j) + 0.58661 \times G(i,j) + 0.11448 \times B(i,j)$$

In the example shown in FIG. 5, a substantially central part of the image is used as the predetermined area, but a plurality of partial areas may be set in the image such that an average value of the luminance values Y in each of the plurality of partial areas is determined. Processing such as calculating the simple average or weighted average of the average values of the respective areas may then be performed to determine the average value $Y_{\_ave}$ of the luminance values Y. The average value $Y_{\_ave}$ of the luminance values Y may also be determined from pixel data corresponding respectively to a plurality of specific pixels that exist discretely within the image and are determined in advance as sample pixels, rather than from a predetermined area in which a plurality of adjacent pixels are gathered (compacted) as described above.

Figure 3:
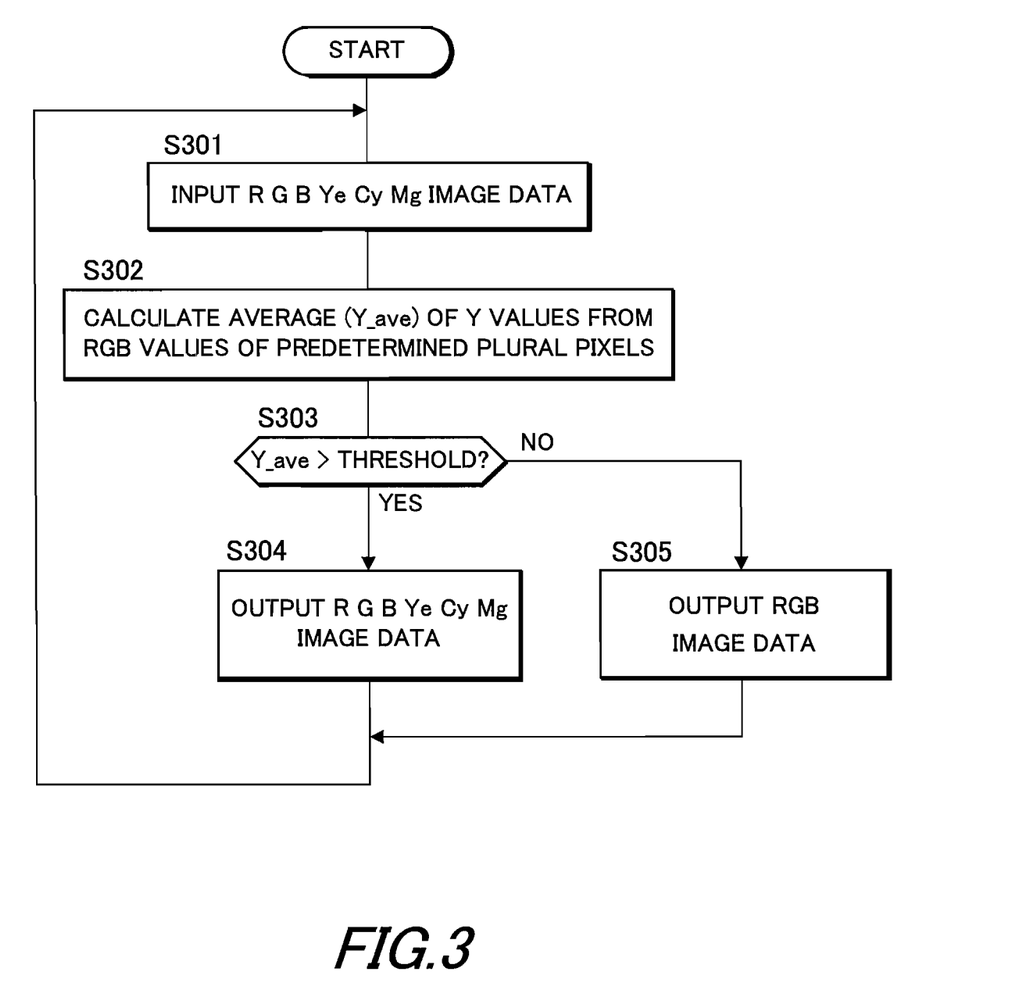
FIG. 3 is a flowchart illustrating an image data processing procedure executed by the image data processing device shown in FIG. 2.

FIG. 3 is a flowchart illustrating an image processing procedure executed by the image data processing device 100A shown in FIG. 2. The procedure shown in FIG. 3 may be implemented using hardware or software. In S301, the image data processing device 100A inputs R, G, B, Ye, Cy, Mg six-band multiband image data from the N-band image capture device 150A. In S302, the image data processing device 100A determines the average value $Y_{\_ave}$ of the luminance values Y from RGB values (the pixel value of each R, G, B color) of the plurality of pixels in the predetermined area, as described above. Next, in S303, the image data processing device 100A determines whether or not the average value $Y_{\_ave}$ of the luminance values Y is greater than a predetermined threshold. Having determined that the average value $Y_{\_ave}$ of the luminance values Y is greater than the predetermined threshold, the image data processing device 100A performs processing in S304 to output the R, G, B, Ye, Cy, Mg six-band multiband image data to the image data recording unit 160, and then returns to the processing of S301. Having determined that the average value $Y_{\_ave}$ of the luminance values Y is not greater than the predetermined threshold in S303, the process branches to S305, where processing is performed to output R, G, B three-band image data to the image data recording unit 160, and then returns to S301. It should be noted that the aforementioned threshold may be set appropriately on the basis of determinations made by a user as to whether image data are to be recorded with as high an image quality as possible or a reduction in data volume is to be prioritized, and so on.

In the image processing procedure performed by the image data processing device 100A and described above with reference to FIG. 3, the processing of S304 is performed, whereby six-band image data are output to the image data recording unit 160, when the average value $Y_{\_ave}$ of the luminance values Y is greater than the predetermined threshold, as described above, or in other words when it is determined that the image generated by the R, G, B three-band image data is comparatively bright. The reason for this is that when an image is bright, it is highly likely to include image data in a wider gamut. By outputting the six-band multiband image data to the image data recording unit when the image is determined to be bright, the gamut of the image is secured. By outputting the three-band image data to the image data recording unit 160 when the image is determined to be dark, on the other hand, the volume of image data corresponding to scenes in which the observer is unlikely to notice a decrease in the gamut (decreased image quality) can be reduced.

Figure 4:
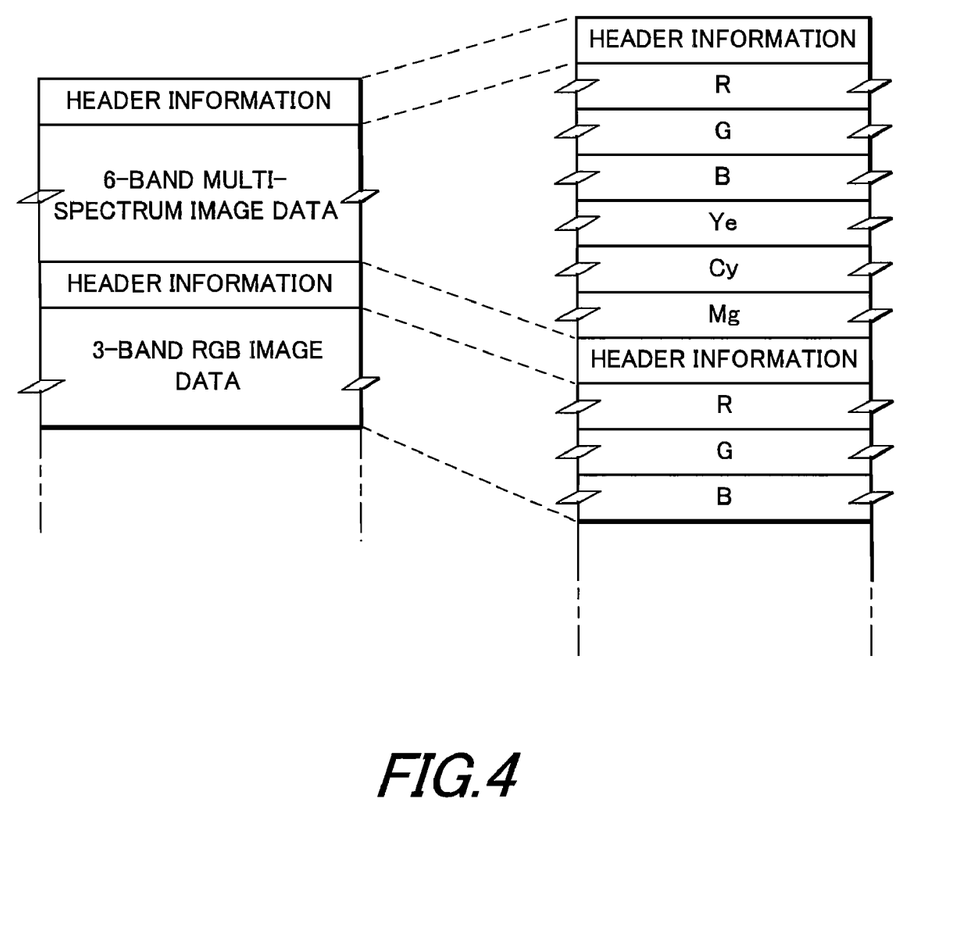
FIG. 4 is a schematic view showing an example of the data format of image data output from the image data processing device according to an embodiment of this invention.

An example of the data format of the image data output to the image data recording unit 160 from the image data processing device 100A will now be described with reference to FIG. 4. Data in the format to be described below may be created by the output image data selection unit 104, or an image data output unit may be provided separately and the data may be created in the image data output unit. The image data output to the image data recording unit 160 contain header information followed by the six-band multiband image data or the three-band RGB image data. The R, G, B or R, G, B, Ye, Cy, Mg image data may be recorded in frame sequence or point sequence.

First, a case in which the image data are recorded in frame sequence will be described. When recording the six-band multiband image data, the RGB image data are recorded first as a single block following the header information, whereupon the Ye, Cy, Mg image data are recorded as another block. When recording the three-band RGB image data, the RGB image data are recorded as a single block following the header information. At this time, information, identifying whether the image data following the header information are three-band RGB image data or six-band multiband image data, is recorded together with the header information.

Next, a case in which the image data are recorded in point sequence will be described. When recording the six-band multiband image data, RGB point sequence image data are recorded first as a single block following the header information, whereupon Ye, Cy, Mg point sequence image data are recorded as another block. When recording the three-band RGB image data, RGB point sequence image data are recorded as a single block following the header information. Further, similarly to the case in which the image data are recorded in frame sequence, information, identifying whether the image data following the header information are three-band RGB image data or six-band multiband image data, is recorded together with the header information.

By recording the three-band RGB image data and the image data other than the three-band RGB image data separately when recording the six-band multiband image data, as described above, the three-band RGB image data can be separated easily, and therefore, when an image based on the image data recorded in the image data recording unit 160, which includes both six-band multiband image data and three-band RGB image data, is to be displayed on a monitor device (not shown) that is only capable of displaying RGB image, an image signal based on the three-band RGB image data alone can be extracted to output to the monitor device. Moreover, maximum data compatibility with a conventional three-band image data processing system can be secured. It should be noted that in this embodiment, a case in which the three-band RGB image data and the six-band multiband image data are output selectively was described as an example, and therefore the data format shown in FIG. 4 only illustrates cases in which six-band image data and three-band image data are output. However, this invention is not limited to the examples of band number combinations illustrated in these embodiments. Furthermore, in the example of the data format used when six-band image data are output shown in FIG. 4, the RGB image data are allocated following the header information and the remaining YeCyMg image data are allocated thereafter, but the allocation order may be reversed. In other words, the YeCyMg image data may be allocated following the header information, and the RGB image data may be allocated thereafter.

When the image data input into the image data processing device 100A are image data once recorded onto a recording device or the like, instead of so-called live image data input directly from an image capture device or the like, the image data processing device 100A may record header information such as the following. By having the image data processing device 100A evaluate all of the input image data in advance, it is possible to know in advance how many continuous frames of six-band multiband image data, how many subsequent continuous frames of three-band RGB image data, how many subsequent continuous frames of six-band multiband image data, and so on are included in the image data output to the image data recording unit 160. Accordingly, tag information indicating whether the image data recorded after the header information are six-band image data or three-band image data and the number of continuous frames thereof can be recorded together with the header information. In this case, the header information need only be attached to the respective header parts of a series of six-band multiband image data and a series of three-band RGB image data containing a plurality of frames, instead of being attached to the data of each frame, as in the example shown in FIG. 4, and as a result, the total data volume can be reduced.

Figure 6:
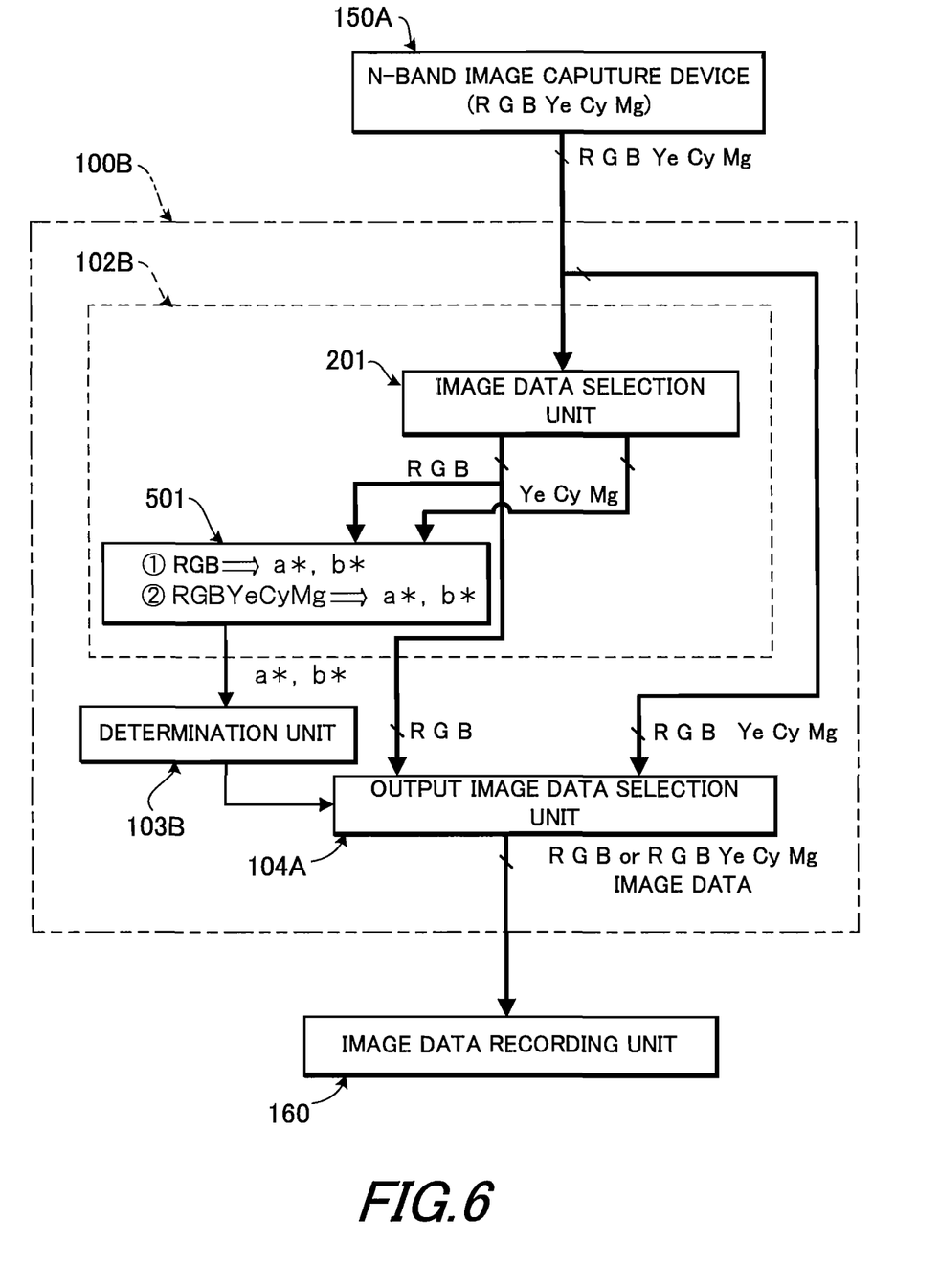
FIG. 6 is a block diagram illustrating an example in which the image data processing device according to an embodiment of this invention determines a chromaticity value on the basis of the input image data.

FIG. 6 is a block diagram illustrating an embodiment in which an image data evaluation information provision unit 102B determines chromaticity values a* and b* in a CIE L* a* b* color system from the three-band RGB image data and the six-band multiband image data, respectively. In FIG. 6, similar constitutional elements to those shown in FIG. 1 and FIG. 2 have been allocated identical reference symbols, and description thereof has been omitted. The following description centers on differences with FIGS. 1 and 2. In an image data processing device 100B shown in FIG. 6, the image data evaluation information provision unit 102B comprises the image data selection unit 201 and an image evaluation unit 501. Of the six-band multiband image data input into the image data selection unit 201, three-band RGB image data and three-band YeCyMg image data are input into the image evaluation unit 501. On the basis of the pixel data R (i, j), G (i, j), B (i, j), Ye (i, j), Cy (i, j), Mg (i, j) of each color included in the input three-band RGB image data and three-band YeCyMg image data, the image evaluation unit 501 determines chromaticity values a* (i, j), b* (i, j) corresponding to each pixel position (i, j). At this time, the image evaluation unit 501 determines the chromaticity values a* (i, j), b* (i, j) (to be referred to hereafter as three-band chromaticity values a*, b*) from the three-band RGB image data using following equations (2), (3) and (4), and determines the chromaticity values a* (i, j), b* (i, j) (to be referred to hereafter as six-band chromaticity values a*, b*) from the six-band RGBYeCyMg multiband image data using the equations (1), (3) and (4).

$$\begin{bmatrix} X(i,j) \\ Y(i,j) \\ Z(i,j) \end{bmatrix} = \begin{bmatrix} M11 & M12 & M13 & M14 & M15 & M16 \\ M21 & M22 & M23 & M24 & M25 & M26 \\ M31 & M32 & M33 & M34 & M35 & M36 \end{bmatrix} \begin{bmatrix} R(i,j) \\ G(i,j) \\ B(i,j) \\ Ye(i,j) \\ Cy(i,j) \\ Mg(i,j) \end{bmatrix} \quad \text{Eq. (1)}$$

$$\begin{bmatrix} X(i,j) \\ Y(i,j) \\ Z(i,j) \end{bmatrix} = \begin{bmatrix} M11 & M12 & M13 \\ M21 & M22 & M23 \\ M31 & M32 & M33 \end{bmatrix} \begin{bmatrix} R(i,j) \\ G(i,j) \\ B(i,j) \end{bmatrix} \quad \text{Eq. (2)}$$

$$a*(i,j) = 500 \times \left[ \left\{ \frac{X(i,j)}{X_{10}} \right\}^{1/3} - \left\{ \frac{Y(i,j)}{Y_{10}} \right\}^{1/3} \right] \quad \text{Eq. (3)}$$

$$b*(i,j) = 200 \times \left[ \left\{ \frac{Y(i,j)}{Y_{10}} \right\}^{1/3} - \left\{ \frac{Z(i,j)}{Z_{10}} \right\}^{1/3} \right] \quad \text{Eq. (4)}$$

In the above equations, X (i, j), Y (i, j), Z (i, j) are values of an XYZ color system determined from the pixel data in the pixel positions (i, j), and M11, M12, ..., M35, M36 are predetermined constants. Further, $X_{10}$, $Y_{10}$, $Z_{10}$ are tristimulus values obtained from standard white reflection in a 10-degree field of view XYZ color system recommended by CIE in 1964. It should be noted that the above equations are examples, and a* (i, j) and b* (i, j) may be determined using a lookup table or the like.

The three-band chromaticity values a*, b* and six-band chromaticity values a*, b* are determined for each of the pixels in the predetermined area of the image, as described above with reference to FIG. 5.

The image evaluation unit 501 outputs the three-band chromaticity value a* (i, j) and six-band chromaticity value a* (i, j) determined in the manner described above to a determination unit 103B. On the basis of the input three-band chromaticity value a* (i, j) and six-band chromaticity value a* (i, j), the determination unit 103B determines whether to output the three-band RGB image data or the six-band multiband image data as the output image data using a method to be described below, and outputs a determination result to the output image data selection unit 104A.

Figure 7:
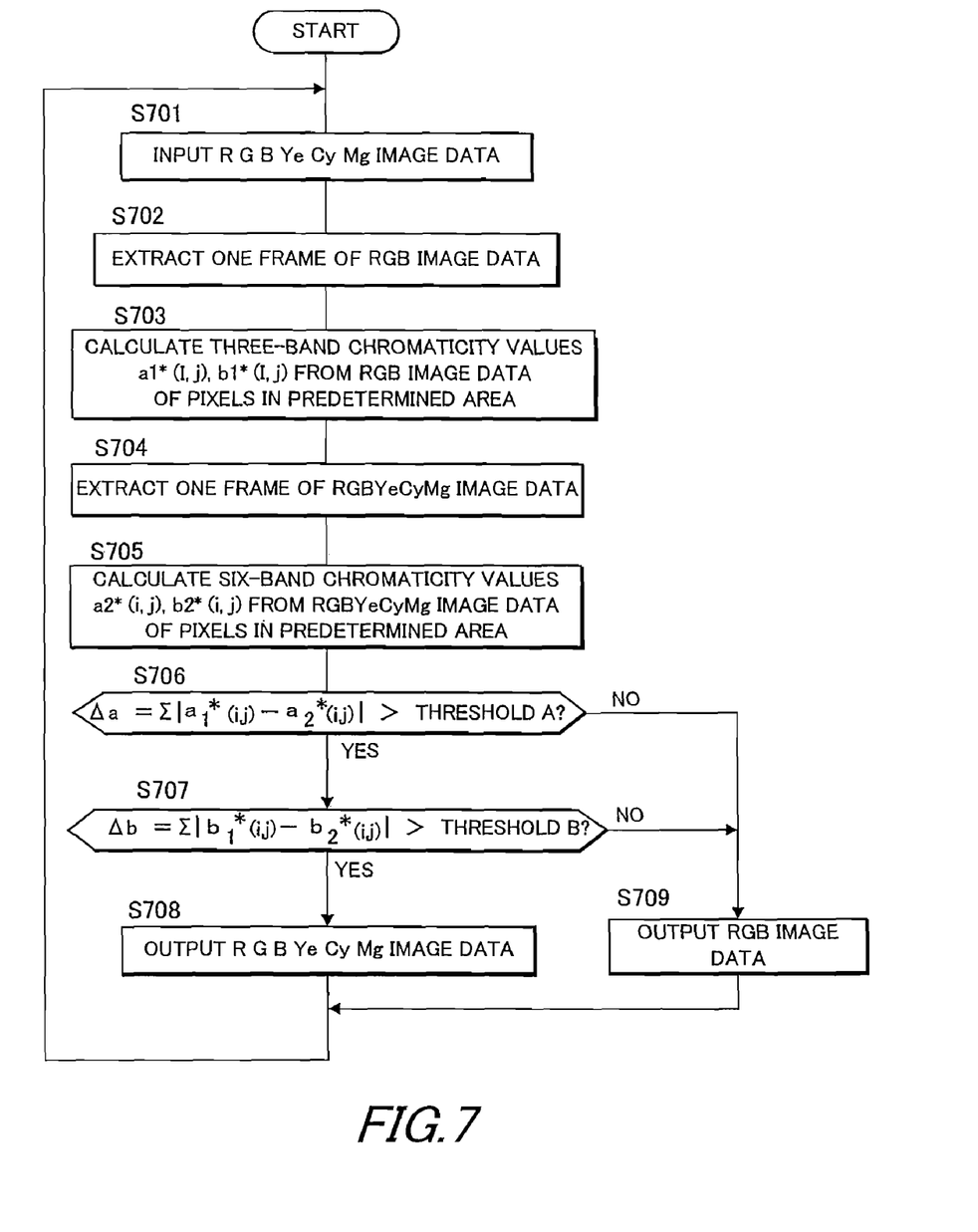
FIG. 7 is a flowchart illustrating an image data processing procedure executed by the image data processing device shown in FIG. 6.

FIG. 7 is a flowchart illustrating an image processing procedure executed by the image data processing device 100B shown in FIG. 6. The procedure shown in FIG. 7 may be implemented using hardware or software. In S701, the image data processing device 100B inputs R, G, B, Ye, Cy, Mg six-band multiband image data from the N-band image capture device 150A. In S702, the image data processing device 100B extracts three-band RGB image data from the six-band multiband image data of a single frame. Next, in S703, the image data processing device 100B calculates all of the three-band chromaticity values a1* (i, j), b1* (i, j) on the basis of the data of each RGB pixel existing within the predetermined area of the image. In S704, the image data processing device 100B extracts RGBYeCyMg six-band multiband image data from the six-band multiband image data of the single frame. Next, in S705, the image data processing device 100B calculates all of the six-band chromaticity values a2* (i, j), b2* (i, j) on the basis of the data of each RGBYeCyMg pixel existing within the predetermined area of the image.

In S706, the image data processing device 100B calculates the absolute value of a difference between the six-band chromaticity value a2* (i, j) and the three-band chromaticity value a1* (i, j) for the pixels in each position of the predetermined area, obtains a sum total $\Delta a$ thereof, and determines whether or not the sum total $\Delta a$ exceeds a predetermined threshold A. In S707, which serves as a bifurcation destination when an affirmative determination is made in S706, the image data processing device 100B calculates the absolute value of a difference between the six-band chromaticity value b2* (i, j) and the three-band chromaticity value b1*(i, j) for the pixels in each position of the predetermined area, obtains a sum total $\Delta b$ thereof, and determines whether or not the sum total $\Delta b$ exceeds a predetermined threshold B. When an affirmative determination is made in S707, the image data processing device 100B advances to S708, where one frame of six-band multiband image data is output to the image data recording unit 160, and then returns to S701.

In S709, which serves as a bifurcation destination when a negative determination is made either in S706 or in S707, the image data processing device 100B outputs one frame of three-band RGB image data to the image data recording unit 160, and then returns to S701. A similar format to that described above with reference to FIG. 4 may be used as the format of the image data output to the image data recording unit 160.

The determinations made in S706 and S707 will now be described. The aforementioned sum totals $\Delta a$, $\Delta b$ may be considered as indices for learning the difference between the size of the gamut reproduced by the six-band multiband image data and the size of the gamut reproduced by the three-band RGB image data. More specifically, when the three-band chromaticity values a1* (i, j), b1* (i, j) and the six-band chromaticity values a2* (i, j), b2* (i, j) are plotted on an a*-b* plane in the color space of an L*a*b* color system and the respective distribution ranges thereof are compared, the six-band chromaticity values a2* (i, j), b2* (i, j) may be considered to be distributed over a wider range of the a*-b* plane, or in other words may be considered to have a wider gamut. Hence, when the sum totals $\Delta a$, $\Delta b$, obtained by determining the three-band chromaticity values a1* (i, j), b1* (i, j) and six-band chromaticity values a2* (i, j), b2* (i, j) in the manner described above in identical pixel positions on the image surface and then determining the sum total $\Delta a$ of the absolute values of the difference between a1* (i, j) and b1* (i, j) and the sum total $\Delta b$ of the absolute values of the difference between a2* (i, j) and b2* (i, j), exceed the predetermined thresholds, this means that the gamut of the image reproduced by the six-band multiband image data is considerably wider than the gamut of the image reproduced by the three-band RGB image data. In other words, when the sum totals $\Delta a$, $\Delta b$ determined from certain six-band multiband image data exceed the predetermined thresholds, the image that is reproduced by the six-band multiband image data has a much wider gamut than the image that is reproduced by the three-band RGB image data, and therefore image reproduction using the six-band multiband image data is desirable. Conversely, with image data obtained from an object having a low chroma, comparatively low sum totals $\Delta a$, $\Delta b$ are to be expected. In this case, the reduction in image quality occurring when the image is reproduced using the three-band RGB image data is not obvious, and therefore the volume of image data can be reduced effectively by outputting the three-band RGB image data to the image data recording unit 160. The aforementioned thresholds may be set appropriately by the user on the basis of determinations as to whether image data are to be recorded with as high an image quality as possible or a reduction in data volume is to be prioritized, and so on.

During the processing for determining $\Delta a$ and $\Delta b$, the three-band chromaticity values a1* (i, j), b1* (i, j) and six-band chromaticity values a2* (i, j), b2* (i, j) may be determined from pixel data corresponding to all of the pixels in the image data, or, as described above, a single part located substantially in the center of the image may be set as a predetermined area, and the processing described above may be performed using the data corresponding to the pixels in the predetermined area. In other words, when leeway exists in the image processing capacity, the three-band chromaticity values a1* (i, j), b1* (i, j) and the six-band chromaticity values a2* (i, j), b2* (i, j) may be determined from pixel data corresponding to all of the pixels in the image data. Conversely, when no leeway exists in the image processing capacity, a partial area of the image data may be sampled, and the processing described above may be performed using the data corresponding to the pixels in the sampled area, thereby reducing the image processing load. Further, as described above, either a single area substantially in the center of the image may be used as sampling areas, or a plurality of partial areas may be set in the image as the sampling area such that the processing described above is performed on each of the plurality of partial areas. In addition, a plurality of specific pixels existing discretely within the image surface may be set as the sampling subject rather than all of the pixels in a certain area, and the processing described above may be performed using the image data corresponding to the sampling subject. Furthermore, the chromaticity value of L* may be determined in addition to the chromaticity values of a* and b*, and the processing for determining $\Delta a$ and $\Delta b$ may be performed using L*, a* and b*.

Figure 8:
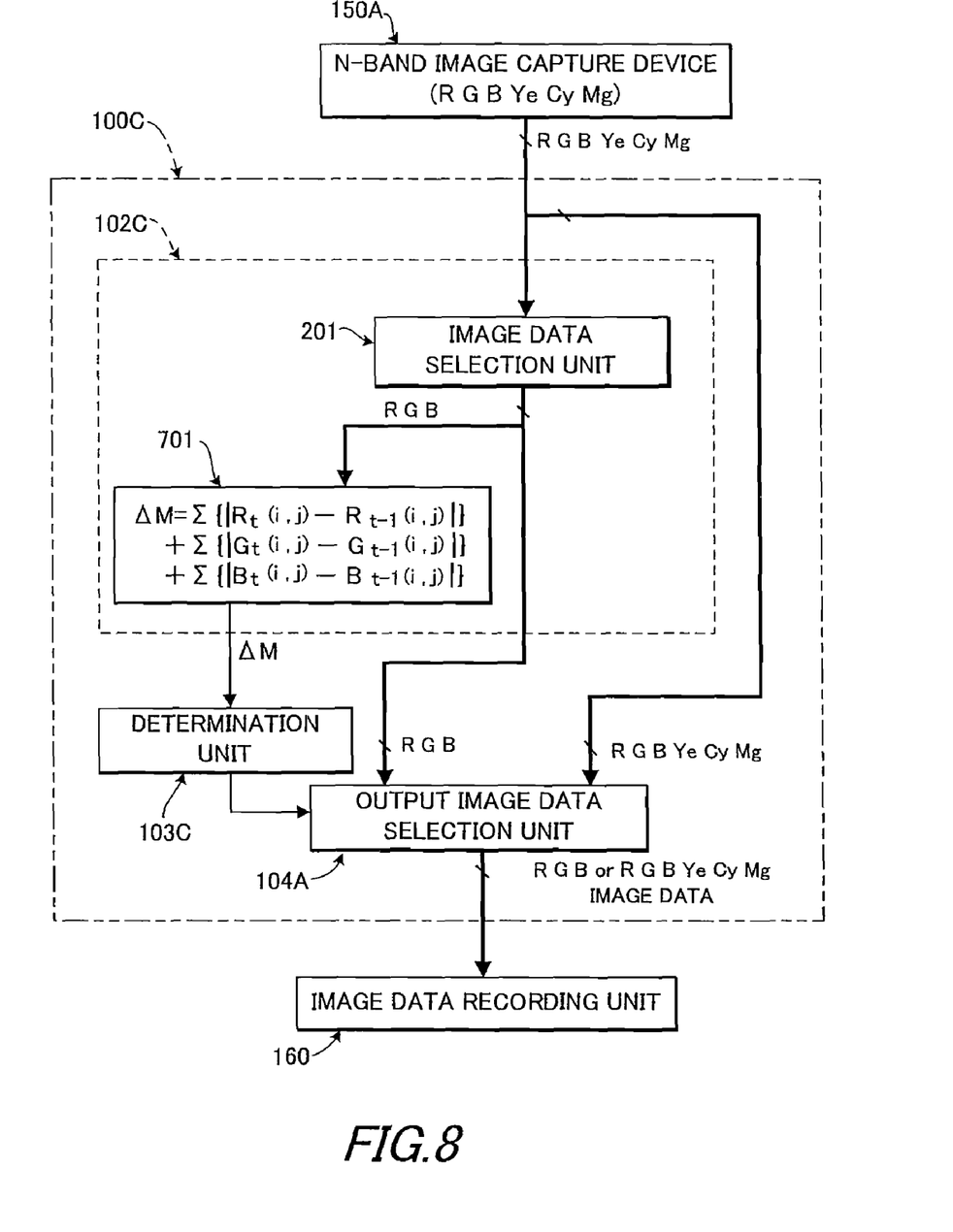
FIG. 8 is a block diagram illustrating an example in which the image data processing device according to an embodiment of this invention determines the magnitude of image variation in response to temporal variation on the basis of the input image data.

FIG. 8 is a block diagram illustrating an embodiment in which an image data evaluation information provision unit 102C uses the three-band RGB image data to determine the degree to which image data (frame data) at a certain time t varies in relation to image data (frame data) at an immediately preceding (prior to and closest to the time t) time t−1. In FIG. 8, similar constitutional elements to those shown in FIGS. 1, 2 and 6 have been allocated identical reference symbols, and description thereof has been omitted. The following description centers on differences with FIGS. 1, 2 and 6. In an image data processing device 100C shown in FIG. 8, the image data evaluation information provision unit 102C comprises the image data selection unit 201 and an image evaluation unit 701. Of the six-band multiband image data input into the image data selection unit 201, the three-band RGB image data (frame data) are input into the image evaluation unit 701. The image evaluation unit 701 holds the immediately preceding three-band RGB image data. The image evaluation unit 701 then determines the amount of variation in the image data from the newest three-band RGB image data and the immediately preceding three-band RGB image data in the following manner. Here, pixel data corresponding to pixels (i, j) in the newest (most recently input) three-band RGB image data are referred to as $R_t(i, j)$, $G_t(i, j)$, $B_t(i, j)$, and pixel data corresponding to pixels (i, j) in the immediately preceding three-band RGB image data are referred to as $R_{t-1}(i, j)$, $G_{t-1}(i, j)$, $B_{t-1}(i, j)$.

The image evaluation unit 701 calculates the absolute value of a difference between the newest three-band RGB image data and the immediately preceding three-band RGB image data for each pixel of the same color in the same pixel position, and determines a sum total ΔM thereof. To calculate ΔM, processing having the content shown in the following equation (5) is performed.

$$\Delta M = \Sigma\{|R_t(i,j)-R_{t-1}(i,j)|\} + \Sigma\{|G_t(i,j)-G_{t-1}(i,j)|\} + \Sigma\{|B_t(i,j)-B_{t-1}(i,j)|\} \quad \text{Eq. (5)}$$

In the manner described above, the image evaluation unit 701 determines a variation index ΔM, which is an index of the amount of variation in the image between two temporally continuous (neighboring) frames, and outputs the determined variation index ΔM to a determination unit 103C. On the basis of the variation index ΔM input by the image evaluation unit 701, the determination unit 103C determines whether to use the three-band RGB image data or the six-band multiband image data as the output image data using a method to be described below, and outputs a determination result to the output image data selection unit 104A. It should be noted that determining ΔM from the three-band RGB image data, as described above, is effective in reducing the time required for the processing. However, when the processing capacity of the image data processing device 100C is sufficiently high, ΔM may be obtained from the six-band multiband image data.

Figure 9:
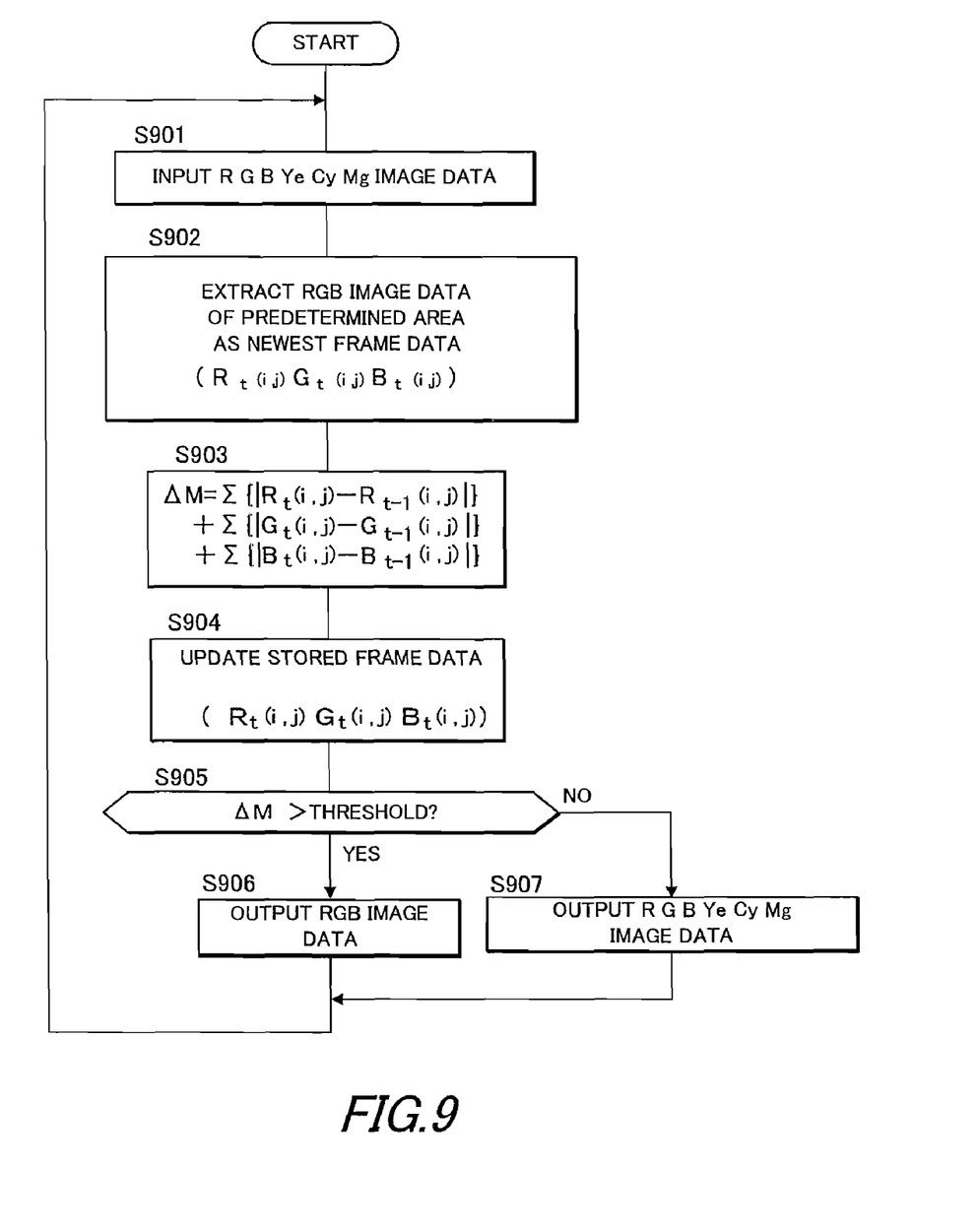
FIG. 9 is a flowchart illustrating an image data processing procedure executed by the image data processing device shown in FIG. 8.

FIG. 9 is a flowchart illustrating an image processing procedure executed by the image data processing device 100C shown in FIG. 8. The procedure shown in FIG. 9 may be implemented by hardware or software. In S901, the image data processing device 100C inputs R, G, B, Ye, Cy, Mg six-band multiband image data from the N-band image capture device 150A. In S902, the image data processing device 100C extracts the three-band RGB image data from the six-band multiband image data, and also extracts pixel data from the predetermined area of the RGB image data as newest frame data. In S903, the image data processing device 100C calculates the absolute value of the difference between the pixel data of the newest frame data extracted in S902 and stored frame data extracted at an immediately preceding point in time for each set of pixel data of the same color in corresponding pixel positions (i, j), and then determines the variation index ΔM by totaling the absolute values. In S904, the image data processing device 100C updates the stored frame data to the newest data. Next, in S905, the image data processing device 100C determines whether or not the variation index ΔM exceeds a predetermined threshold. In S906, which serves as the bifurcation destination when an affirmative determination is made in S905, the image data processing device 100C outputs a single frame of the three-band RGB image data to the image data recording unit 160, and then returns to S901.

In S907, which serves as the bifurcation destination when a negative determination is made in S905, the image data processing device 100C outputs a single frame of the six-band multiband image data to the image data recording unit 160, and then returns to S901. A similar format to that described above with reference to FIG. 4 may be employed for the image data output to the image data recording unit 160.

The variation index ΔM determined in S903 and the determination made in S905 will now be described. A situation in which large variation occurs in the RGB pixel values in identical pixel positions between two sets of temporally continuous frame data may be considered to arise when large image variation occurs between two continuous (neighboring) frames. Cases in which large variation occurs in an image may arise when a camera pans, zooms in, or zooms out during image capture, or when an object occupying the majority of the image surface moves across the image surface at a comparatively high speed. Alternatively, in the case of an image having a comparatively high contrast and a comparatively high spatial frequency, the variation index ΔM may increase even if the object on the image surface moves comparatively slowly.

In all of the situations described above, variation in the displayed image is comparatively large, and therefore, even when an image generated by the three-band RGB image data is displayed, deterioration of the image quality is not obvious. Hence, when the variation index ΔM is larger than the predetermined threshold, the volume of image data can be reduced effectively by outputting the three-band RGB image data to the image data recording unit 160. Conversely, when the variation index ΔM is smaller than the predetermined threshold, movement on the image surface is comparatively slow, and therefore deterioration of the image quality is likely to be obvious when an image generated by the three-band RGB image data is displayed. In this situation, a high degree of image quality can be maintained by outputting the six-band multiband image data to the image data recording unit 160 so as to emphasize color reproducibility. The threshold may be set appropriately on the basis of determinations made by the user as to whether image data are to be recorded with as high an image quality as possible or a reduction in data volume is to be prioritized, and so on.

During the processing of S902 and S903, the variation index ΔM may be determined from pixel data corresponding to all of the pixels in the image data, or, as described above, a single part located substantially in the center of the image may be set as a predetermined area, and the processing described above may be performed using the data corresponding to the pixels in the predetermined area. Further, a plurality of partial areas may be set in the image such that the processing described above is performed on each of the plurality of partial areas, or the processing described above may be performed using pixel data corresponding to a plurality of predetermined specific pixels existing discretely within the image surface as a sampling subject.

Furthermore, in the example described above, image variation is estimated from the amount of variation per unit time in the pixel data of certain subject pixels. However, a so-called motion vector may be determined, and image variation may be estimated from the magnitude of the motion vector. Techniques for determining a motion vector are widely known in MPEG image compression technology, and are therefore omitted here.

In the examples described above, input image data are classified, evaluated, and determined automatically by the image data processing device 100, 100A, 100B, or 100C, whereupon either three-band RGB image data or six-band multiband image data are selected as the image data to be output to the image data recording unit 160. In contrast, FIG. 10 shows an example in which the observer decides which of the three-band RGB image data and the six-band multiband image data are to be recorded.

Figure 10:
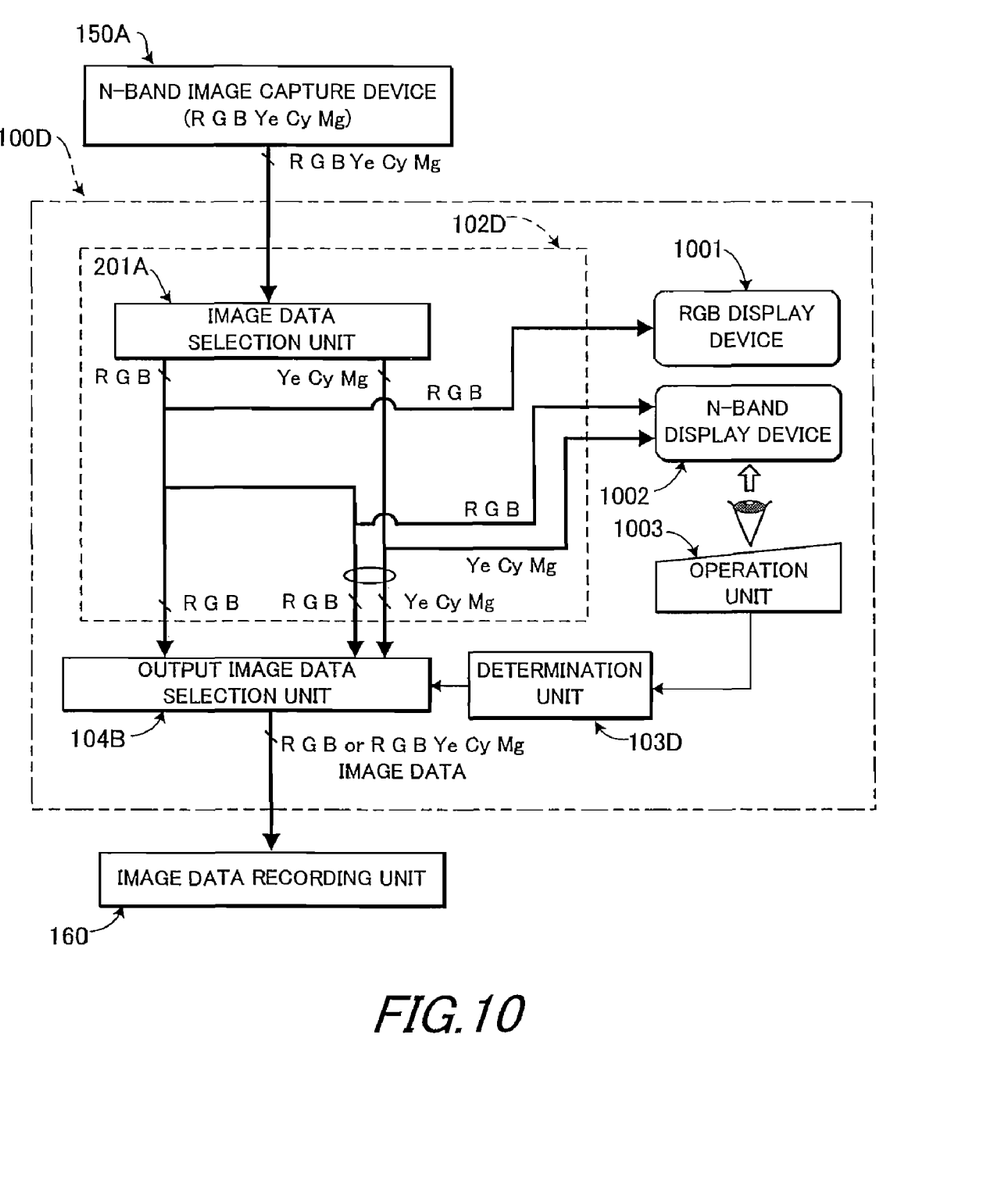
FIG. 10 is a block diagram illustrating an example in which the image data processing device according to an embodiment of this invention is configured such that a user can observe, compare images displayed on the basis of the input image data, and select the type of image data to be output.

In FIG. 10, similar constitutional elements to those shown in FIGS. 1, 2, 6 and 8 have been allocated identical reference symbols, and description thereof has been omitted. The following description centers on differences with FIGS. 1, 2, 6 and 8. In an image data processing device 100D shown in FIG. 10, display devices 1001 and 1002 are connected to an image data evaluation information provision unit 102D. The display devices 1001 and 1002 may be disposed in the interior or on the exterior of the image data processing device 100D. The display device 1001 is capable of displaying RGB images, while the display device 1002 is capable of displaying images of N-primary colors. The display devices 1001 and 1002 may be replaced by a single display device capable of displaying images of N-primary colors. In this case, two images are displayed side by side on a single display screen such that an image based on three-band RGB image data is displayed on one side and an image based on N-band multiband image data is displayed on the other side. Alternatively, an image based on three-band RGB image data and an image based on N-band multiband image data may be displayed alternately on the display screen of a display device capable of displaying images of N-primary colors. It is assumed in the following description that the two display devices 1001 and 1002 are provided, as shown in FIG. 10.

In FIG. 10, on the basis of six-band multiband image data input from the N-band image capture device 150A, an image data selection unit 201A outputs the three-band RGB image data to the display device 1001 and outputs the six-band multiband image data to the display device 1002. The observer (user) visually compares the image based on three-band RGB image data displayed on the display device 1001 and the image based on N-band multiband image data displayed on the display device 1002, and when there appears to be no large difference in image quality between the two displayed images, the user may select the three-band RGB image data as the image data to be output to the image data recording unit 160. Conversely, when the image based on N-band multiband image data appears to be superior to the image based on three-band RGB image data, the user may select the N-band multiband image data as the image data to be output to the image data recording unit 160. Thus, the image data processing device 100D is configured such that on the basis of the comparison results of a plurality of images displayed in the manner described above, the user can set the type of image data to be output to the image data recording unit 160 from an output image data selection unit 104B by operating an operation unit 1003 such as a remote control device or a switch provided on the image data processing device 100D. On the basis of the user settings described above, a determination unit 103D determines whether the image data to be output from the image data processing device 100D are the N-band multiband image data or the three-band RGB image data having a reduced band number, and outputs a determination result to the output image data selection unit 104B. On the basis of the determination result output by the determination unit 103D, the output image data selection unit 104B selects either the N-band multiband image data or the three-band RGB image data that can be input from the image data evaluation information provision unit 102D, and outputs the selected data to the image data recording unit 160.

An example in which the N-band multiband image is a six-band multiband image of R. G. B. Ye, Cy, Mg was described in the above embodiments, but this invention is not limited to this example, and the band number may be set at an arbitrary integer of four or more. The wavelength range of each band may also be set arbitrarily. Further, an example in which a three-band RGB image is output to the image data recording unit 160 as image data having a reduced band number was described above, but the data amount may also be reduced by outputting an N-band multiband image to the image data recording unit 160 as an M-band image (M being an integer of three or more and smaller than N). At this time, the band number when outputting the image data having a reduced band number may be modified in accordance with the content of the input image data. For example, the N-band image capture device 150 may be capable of outputting 16-band multiband image data. In this case, the band number of the image data output to the image data recording unit 160 may be varied momentarily in accordance with a comparison result of displayed images, as described above, the image data storage capacity of the image data recording unit 160, etc. so as to be 16 bands at certain times, 3 bands at other times, and 8 bands at other times. In so doing, it is possible to maintain the image quality of the subsequently reproduced images while reducing the data volume. Alternatively, the band number when outputting image data having a reduced band number may be set appropriately by the user. At this time, the image data output to the image data recording unit 160 may employ a data format such as that described above with reference to FIG. 4, whereby the band number of the image data, the wavelength range of each band constituting the image data, and so on is recorded in the header information. Hence, by reading the header information on the side of a machine that performs image reproduction on the basis of the image data, it is possible to obtain the band constitution of the image data following the header information. Therefore, the processing for reproducing/displaying the images can be performed easily, and optimized image display can be performed.

The image data processing technique according to this invention may be applied to a device that processes input image data and records the processed image data onto a recording medium, a recorder for recording/reproducing image data, and a device that processes image data before the data are transmitted from a wired or wireless broadcasting station to a subscriber. The image data processing technique according to this invention may also be applied to a device for generating image data (an image signal) used to manufacture a master during the mass production of read-only optical disks or the like containing movie software, and so on.

The entire contents of Japanese Patent Application JP2007-162851 (filed on Jun. 20, 2007) are incorporated herein by reference.

What is claimed is:
1. An image data processing device that processes multiband image data of four or more bands, comprising:
an image data evaluation information provision unit that provides evaluation information on the basis of input multiband image data;

a determination unit that determines, on the basis of the evaluation information, whether image data to be output are the multiband image data or reduced band number image data having a smaller band number than the multiband image data; and an image data selection unit that selects either the multiband image data or the reduced band number image data as the image data to be output on the basis of a determination result of the determination unit.

2. The image data processing device as defined in claim 1, wherein the image data evaluation information provision unit is configured to provide a luminance value as the evaluation information, said luminance value being obtained on the basis of the multiband image data.

3. The image data processing device as defined in claim 1, wherein the image data evaluation information provision unit is configured to provide a chromaticity value of a CIE-L*a*b* color system, obtained on the basis of the multiband image data, as the evaluation information.

4. The image data processing device as defined in claim 1, wherein the image data evaluation information provision unit is configured to provide a pixel data variation amount per unit time from a variation amount in pixel data corresponding to pixels in identical positions, which is obtained on the basis of the multiband image data at a certain timing and the multiband image data at a previous timing thereto, as the evaluation information.

5. The image data processing device as defined in claim 1, wherein the image data evaluation information provision unit is configured to provide the evaluation information by displaying images based on the input multiband image data and reduced band number image data simultaneously or alternately, and the determination unit is configured to determine that image data, corresponding to an image selected by a user from among the image displayed on the basis of the multiband image data and the image displayed on the basis of the reduced band number image data, are the image data to be output.

6. The image data processing device as defined in claim 1, further comprising an image data output unit that outputs the image data selected by the image data selection unit, wherein, when image data output by the image data output unit are the multiband image data, the image data output unit divides the image data into two parts, and outputs the image data in a data format in which image data corresponding to the reduced band number image data are allocated to one part and remaining image data of the multiband image data are allocated to another part.

7. The image data processing device as defined in claim 2, further comprising an image data output unit that outputs the image data selected by the image data selection unit, wherein, when image data output by the image data output unit are the multiband image data, the image data output unit divides the image data into two parts, and outputs the image data in a data format in which image data corresponding to the reduced band number image data are allocated to one part and remaining image data of the multiband image data are allocated to another part.

8. The image data processing device as defined in claim 3, further comprising an image data output unit that outputs the image data selected by the image data selection unit, wherein, when image data output by the image data output unit are the multiband image data, the image data output unit divides the image data into two parts, and outputs the image data in a data format in which image data corresponding to the reduced band number image data are allocated to one part and remaining image data of the multiband image data are allocated to another part.

9. The image data processing device as defined in claim 4, further comprising an image data output unit that outputs the image data selected by the image data selection unit, wherein, when image data output by the image data output unit are the multiband image data, the image data output unit divides the image data into two parts, and outputs the image data in a data format in which image data corresponding to the reduced band number image data are allocated to one part and remaining image data of the multiband image data are allocated to another part.

10. The image data processing device as defined in claim 5, further comprising an image data output unit that outputs the image data selected by the image data selection unit, wherein, when image data output by the image data output unit are the multiband image data, the image data output unit divides the image data into two parts, and outputs the image data in a data format in which image data corresponding to the reduced band number image data are allocated to one part and remaining image data of the multiband image data are allocated to another part.

11. An image data processing method for processing multiband image data of four or more bands, comprising:

providing evaluation information on the basis of input multiband image data;

determining, on the basis of the evaluation information, whether image data to be output are the multiband image data or reduced band number image data having a smaller band number than the multiband image data; and selecting either the multiband image data or the reduced band number image data as the image data to be output on the basis of a determination result of the determining.

12. The image data processing method as defined in claim 11, wherein providing the evaluation information includes providing a luminance value obtained on the basis of the multiband image data as the evaluation information.

13. The image data processing method as defined in claim 11, wherein providing the evaluation information includes providing a chromaticity value of a CIE-L*a*b* color system, obtained on the basis of the multiband image data, as the evaluation information.

14. The image data processing method as defined in claim 11, wherein providing the evaluation information includes providing a pixel data variation amount per unit time from a variation amount in pixel data corresponding to pixels in identical positions, which is obtained on the basis of the multiband image data at a certain timing and the multiband image data at a previous timing thereto, as the evaluation information.

15. The image data processing method as defined in claim 11, wherein providing the evaluation information includes displaying images based on the input multiband image data and reduced band number image data simultaneously or alternately, and the determination includes determining that image data, corresponding to an image selected by a user from among the image displayed on the basis of the multiband image data and the image displayed on the basis of the reduced band number image data, are the image data to be output.

16. The image data processing method as defined in claim 11, further comprising formatting the image data selected as the image data to be output, wherein formatting the selected image data includes dividing the image data to be output into two parts when the multiband image data are selected as the image data to be output, and outputting the image data in a data format in which image data corresponding to the reduced band number image data are allocated to one part and remaining data of the multiband image data are allocated to another part.

17. The image data processing method as defined in claim 12, further comprising formatting the image data selected as the image data to be output,
wherein formatting the selected image data includes dividing the image data to be output into two parts when the multiband image data are selected as the image data to be output, and outputting the image data in a data format in which image data corresponding to the reduced band number image data are allocated to one part and remaining data of the multiband image data are allocated to another part.

18. The image data processing method as defined in claim 13, further comprising formatting the image data selected as the image data to be output,
wherein formatting the selected image data includes dividing the image data to be output into two parts when the multiband image data are selected as the image data to be output, and outputting the image data in a data format in which image data corresponding to the reduced band number image data are allocated to one part and remaining data of the multiband image data are allocated to another part.

19. The image data processing method as defined in claim 14, further comprising formatting the image data selected as the image data to be output,
wherein formatting the selected image data includes dividing the image data to be output into two parts when the multiband image data are selected as the image data to be output, and outputting the image data in a data format in which image data corresponding to the reduced band number image data are allocated to one part and remaining data of the multiband image data are allocated to another part.

20. The image data processing method as defined in claim 15, further comprising formatting the image data selected as the image data to be output,
wherein formatting the selected image data includes dividing the image data to be output into two parts when the multiband image data are selected as the image data to be output, and outputting the image data in a data format in which image data corresponding to the reduced band number image data are allocated to one part and remaining data of the multiband image data are allocated to another part.

* * * * *